Aug. 11, 1953
S. D. ROSS ET AL
2,648,717
ELECTROLYTIC MEMBRANE
Filed June 26, 1951
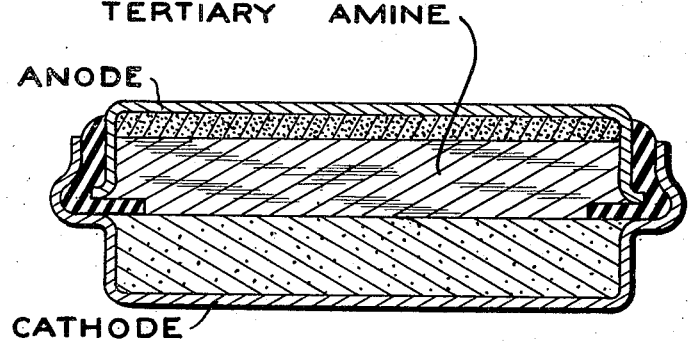
SIDNEY D. ROSS
MOUSHY MARKARIAN
WALTER W. SCHROEDER, JR.,
*INVENTORS*
BY *Connolly and Hutz*
THEIR ATTORNEYS

Patented Aug. 11, 1953

2,648,717

UNITED STATES PATENT OFFICE

2,648,717

ELECTROLYTIC MEMBRANE

Sidney D. Ross, Williamstown, Moushy Markarian, North Adams, and Walter W. Schroeder, Jr., Williamstown, Mass., assignors to Sprague Electric Company, North Adams, Mass., a corporation of Massachusetts Application June 26, 1951, Serial No. 233,708

7 Claims. (Cl. 136—107)

This invention relates to improved plastic materials and specifically refers to a membrane suitable for use in electrochemical systems such as batteries.

In describing the present invention, particular attention will be given to one of the more important applications to which the plastic film of the invention can be put. This application is as a barrier material in a battery system, as for example, alkaline zinc-mercuric oxide cells. In such cells a barrier is ordinarily provided between the mercuric oxide depolarizer element and the zinc anode element to prevent deterioration of the cell during shelf life due to migration of depolarizer particles and other phenomena which are not fully understood. The carrier is usually adjacent to the depolarizer. There are a number of barrier materials which have been used in the past with varying degrees of success. One of these is parchment paper which, while effective for a short period of time undoubtedly is decomposed by the mercuric oxide, apparently by oxidation. Another barrier material is asbestos paper which, while relatively stable in the system is difficult to secure and control with proper pore size and membrane action. Another barrier material which has been suggested is porous rubber which is not only difficult to obtain in a useful porosity but also is fabricated in relatively heavy thicknesses unsuitable for use where space is at a premium. The problem is aggravated by the use of carboxy methyl cellulose electrolyte gelling agent, as this material is oxidized by the mercuric oxide, causing liquifaction of the electrolyte.

One barrier material which has been used is a cast film of polyvinyl alcohol. Such films are obtainable in almost any thickness even as low as one mil. Unfortunately, however, the films offer a very high series resistance in the internal cell structure. For this reason, they are not suitable for use in mercuric oxide-zinc alkaline cells, where heavy drains are encountered. Such cells are desirably employed on moderate to heavy drains because of their volumetric efficiency.

It is an object of the present invention to overcome the foregoing and related disadvantages. A further object is to produce new and useful plastic materials. A still further object is to produce membrane films characterized by very low resistivity for use in alkaline electro-chemical systems. Additional objects will become apparent from the following description and claims.

These objects are attained, in accordance with the present invention, wherein there is produced a low resistance polyvinyl alcohol film by treatment of polyvinyl alcohol with an alkaline organic solvent.

In a more restricted sense, the invention is concerned with a low resistivity polyvinyl alcohol film comprising polyvinyl alcohol film which has been reacted with a material selected from the class containing pyridine, substituted pyridines, and aromatic tertiary amines.

In accordance with one of the limited embodiments of the invention, the invention is concerned with a thermally stable polyvinyl alcohol film comprising polyvinyl alcohol which has been treated with pyridine.

We have discovered that polyvinyl alcohol films may be rendered ideally suited for membrane applications, particularly for alkaline battery systems, by treatment with tertiary amines of the heterocyclic and aromatic types. Examples of suitable compounds are pyridine, quinoline, and beta picoline where the nitrogen is a component of the heterocyclic ring; and di-methyl aniline, di-ethyl aniline and di-methyl-beta-naphthylamine where the nitrogen is not part of a ring structure. The resulting films, which may be slightly swelled over the original untreated state, have a low resistance. While the exact resistance value is not known, it can be compared with materials of known performance in alkaline mercuric oxide-zinc batteries, as noted in the examples which follow.

The thickness of the film which may be treated in accordance with my invention depends upon the particular nitrogen containing compound, the time of treatment and the method of treatment, but may be relatively thick, e. g., greater than about 20 mils. Most applications for membranes employ film thicknesses of from 1 to 10 mils and this is a preferred range. Ordinarily the polyvinyl alcohol film is initially cast from a water or other solution, followed by solvent removal. The tough dry film may then be immersed in the reactant amine.

After treatment of the film, the film may be blotted to dry the surface thereof and to remove the excess amine, following which it may be employed as a low resistivity membrane.

The grade of polyvinyl alcohol used is dependent upon the physical and chemical characteristics desired in the final film. Variations in molecular weight and in degrees of hydrolysis are possible. We ordinarily operate with polyvinyl alcohol having viscosities from about 4 to about 120, as determined on a 4 percent solution in $H_2O$ at 20° C. with a Hoeppler filling ball, and with percent hydrolysis from about 40 percent to about 100 percent.

The following example is representative of the preparation of the films of the invention. A solution was made up by dissolving 10 parts polyvinyl alcohol of viscosity about 40 and percent hydrolysis about 90, in 90 parts of water. A film was cast from the solution to give a dry thickness of 1 mil. After thorough drying, the film was immersed in pyridine for 2 hours at 100° C. When needed it was removed from the pyridine, blotted and used in the experimental batteries described below.

A series of alkaline zinc-mercuric oxide cells were made according to the following construction:

(a) *Anode.*—Amalgamated zinc discs inserted in a copper top.

(b) *Electrolyte.*—An electrolyte consisting of 100 grams of potassium hydroxide, 13.3 grams of zinc oxide and 100 grams of water was prepared. To 100 cc. of this was added 3.5 grams of carboxy methyl cellulose to form a hot solution. The hot solution was poured into the anode and allowed to gel upon cooling.

(c) *Barrier.*—See below.

(d) *Depolarizer.*—The depolarizer was a mixture of 95 parts of mercuric oxide and 5 parts of graphite consolidated in a nickel plated steel can.

(e) *Assembly.*—The cells, with barrier where noted, were crimped with a polyethylene grommet.

Sets of cells corresponding to the construction noted above were made (1) without barriers; (2) with the barrier described in the above example; and (3) with a parchment paper barrier of thickness comparable to the polyvinyl alcohol barrier.

Characteristics of these three sets of batteries immediately after assembly and after 65 days at +55° C. are tabulated below.

| Barrier | Initial | | After 65 days | |
|---|---|---|---|---|
| | Q [1] | Life [2] | Q [1] | Life [2] |
| None | 75 | 71 | 78 | 42 |
| Parchment Paper | 0 | 70 | 77 | 62 |
| Treated PVA | 64 | 69 | 63 | 70 |

[1] "Q" is a measure of the internal resistance of the cell and is in inverse relation thereto. A high "Q" value means that the cell has a low internal resistance and is thus suited for high drains.
[2] "Life" is the discharge life in hours to a 0.9 volt end potential for a single cell across a 32 ohm load at +70° F. This is a moderate drain for the cells tested.

It will be noted that the modified PVA (polyvinyl alcohol) barrier did not add appreciably to the initial internal resistance, since the "Q" value was almost as high as the cells without barrier. Further, the discharge characteristics were satisfactory.

After the elevated temperature storage period, the discharge characteristics of the cells employing the barriers of the invention were very good, while the cells without barrier were poor and the cells with a conventional barrier were demonstrating a loss of about 10 per cent in capacity.

Barriers of untreated polyvinyl alcohol films have characteristics as poor as or poorer than those of parchment paper, as indicated above. In fact untreated polyvinyl alcohol films are so poor that they are commercially unusable in the above type of cell.

The pretreatment of the present invention can be effected at any temperature, from the freezing point of the amine to temperatures as high as 250° C., even though the amine is in vaporized condition. Generally about 5 minutes produces considerable improvement, although the treatment can be even shorter at the higher temperatures.

We have further found that our process for modifying the polyvinyl alcohol permits other chemical treatments not heretofore possible. For example, the PVA film, treated as indicated with pyridine or a tertiary aromatic amine, may be reacted with organic polyisocyanates, to effect cross-linking (by reaction of the —OH groups) between polymer chains. This results in the formation of a polymer no longer soluble in water, and possessing increased thermal stability. By way of example, a di-isocyanate, such as 2,4-tolylene di-isocyanate or hexamethylene di-isocyanate, may be added to the amine before or after the latter is in contact with the PVA film. After allowing the cross-linking agent to contact the PVA film for about ten minutes at room temperature, the film may be removed from the reactant solution and thereafter baked at about 100° C., for example, to complete the cross-linking reaction. Useful, water-insoluble film are thus obtained. Without the amine pretreatment the polyvinyl alcohol film will react with the polyisocyanate only to a limited extent and the reaction product will be soluble in water. Apparently the cross-linking reaction of untreated polyvinyl alcohol film is confined to an extremely thin stratum of its surface.

Cross-linking can be effected at substantially any temperature but requires prolonged exposure unless the exposure is terminated by a baking step, at temperatures at least as high as 75° C. One hour at this temperature is sufficient and even shorter periods are suitable at higher temperatures.

The above illustration is typical of the utility of our invention as a means of placing the PVA in a condition in which it can undergo chemical reactions of various types. Aqueous solutions of the polymer are not suitable for many reactions, of which the cross-linking referred to above is representative.

As many apparently widely different embodiments of this invention may be made without departing from the spirit and scope hereof, it is to be understood that the invention is not limited to the specific embodiments hereof, except as defined in the appended claims.

A diagrammatic drawing illustrating electric cells of the invention accompanies the instant disclosure. In this cell the essential features of the invention, to wit, an anode, a cathode, and an electrolytic barrier comprising polyvinyl alcohol which has been treated with a cyclic tertiary amine have all been specifically labelled for convenience. No numerals are given in the drawing because they are not believed to be necessary for the clear understanding of the subject matter.

What is claimed is:

1. An electric cell which comprises a zinc anode, an alkaline electrolytic, an electrolytic barrrier membrane comprising polyvinyl alcohol which has been treated with pyridine, and a mercuric oxide cathode.

2. An alkaline cell which comprises an amalgamated zinc anode, a gelled alkaline electrolyte, a barrier membrane consisting of polyvinyl alcohol which has been treated with pyridine, a mercuric oxide-graphite depolarizer, and a steel container holding said anode, electrolyte, barrier, and depolarizer.

3. An electric cell which comprises an anode, an electrolyte, and electrolytic barrier comprising polyvinyl alcohol which has been treated with a cyclic tertiary amine, and a cathode.

4. An electric cell which comprises an anode, an electrolyte, and electrolytic barrier comprising polyvinyl alcohol which has been treated with a cyclic tertiary amine, and an organic polyisocyanate, and a cathode.

5. An electric cell which comprises an anode, an electrolyte, an electrolytic barrier comprising polyvinyl alcohol which has been treated with pyridine, and a cathode.

6. An electric cell as defined in claim 6 wherein said barrier comprises polyvinyl alcohol which has been treated with pyridine and an organic polyisocyanate.

7. A process which comprises utilizing an electrolytic barrier comprising polyvinyl alcohol which has been treated with a cyclic tertiary amine as an electrolytic barrier membrane in an electrical assembly and passing current through said membrane.

SIDNEY D. ROSS.
MOUSHY MARKARIAN.
WALTER W. SCHROEDER, Jr.

References Cited in the file of this patent

UNITED STATES PATENTS

| Number | Name | Date |
|---|---|---|
| 588,905 | Hammacher | Aug. 24, 1897 |
| 660,979 | Weymersch | Oct. 30, 1900 |
| 1,357,450 | Goissedet | Nov. 2, 1920 |
| 2,208,216 | Johnson et al. | July 16, 1940 |
| 2,277,083 | Dorough | Mar. 24, 1942 |
| 2,292,921 | Bock et al. | Aug. 11, 1942 |
| 2,466,404 | Fowler et al. | Apr. 5, 1949 |
| 2,520,609 | Morgan | Aug. 29, 1950 |
| 2,531,468 | Reynolds | Nov. 28, 1950 |